United States Patent [19]

Landman et al.

[11] Patent Number: 5,100,542

[45] Date of Patent: Mar. 31, 1992

[54] DISPENSER OF LIQUID AGENT FOR TREATING A RECIRCULATED BODY OF WATER

[75] Inventors: F. William Landman, Glendora; Frank Soto, Saugus, both of Calif.

[73] Assignee: GPS Pool Supply, Inc., City of Industry, Calif.

[21] Appl. No.: 658,880

[22] Filed: Feb. 22, 1991

[51] Int. Cl.⁵ .............................................. B01D 29/88
[52] U.S. Cl. ................................. 210/101; 137/205.5; 137/209; 210/117; 210/136; 210/169; 210/258; 210/416.2; 251/208; 251/215
[58] Field of Search ..................... 210/198.1, 169, 258, 210/101, 136, 117, 416.1, 416.2; 251/208, 215; 137/205.5, 209; 222/110

[56] References Cited

U.S. PATENT DOCUMENTS

| | | | |
|---|---|---|---|
| 3,867,289 | 2/1975 | Ortega | 210/169 |
| 3,867,290 | 2/1975 | Mackey | 210/169 |
| 4,285,498 | 8/1981 | Nightingale | 251/215 |
| 4,879,027 | 11/1989 | Sanders | 210/169 |
| 4,917,795 | 4/1990 | Sable et al. | 210/169 |
| 5,005,601 | 4/1991 | Strong | 137/209 |

Primary Examiner—Robert A. Dawson
Assistant Examiner—Sun Uk Kim
Attorney, Agent, or Firm—A. M. Fernandez

[57] ABSTRACT

Concentrated sanitizing liquid is stored in a main reservoir coupled directly to a measured reservoir by a check valve so that it automatically refills upon being emptied by air under pressure from a positive pressure cylinder. That cylinder partially fills with swimming pool water being recirculated by a centrifugal pump to produce the pressurized air. A check valve on top of the cylinder is provided to allow the cylinder to fill with air at atmospheric pressure when the pump is turned off, thus relieving the water pressure in the cylinder. A control valve between the measured reservoir and the intake side of the pump controls the rate of flow of liquid sanitizing agent into the recirculated flow of pool water. That rate is so low as to result in drops which are collected in a chamber at the output of the control valve. Suction from the pool pump draws the collected liquid into the pump where it is mixed with recirculated water.

8 Claims, 3 Drawing Sheets

DISPENSER OF LIQUID AGENT FOR TREATING A RECIRCULATED BODY OF WATER

TECHNICAL FIELD

This invention relates to a dispenser of a liquid for the sanitation of swimming pool water, and more particularly to an apparatus for continually metering sanitizing liquid into the water of a swimming pool as it is recirculated.

BACKGROUND OF THE INVENTION

It is common practice to recirculate water in a swimming pool for filtration and aeration and, if desired, for heating. It is also common practice, and in fact imperative, to treat the water with a sanitizing agent to kill pathogenic bacteria.

The most widely used technique for sanitizing swimming pool water is to periodically add concentrated chlorine or sodium hypochlorite, the aqueous solutions of which are effective bactericides. However, dilute aqueous solutions tend to decompose on exposure to sunlight and contact with metals, such as copper. Since it is desirable to maintain available chlorine at levels between 0.4 to 1.5 parts per million (ppm) and to keep the pH at a level of about 7 to 8, it becomes necessary to add many times this amount of available chlorine in the course of a sunny day.

In order to stabilize the free chlorine in pool water, cyanurates or other materials may be added, but there is still a need to continually check the swimming pool and periodically add liquid chlorine. This procedure of checking and adding liquid chlorine must usually be repeated on a weekly basis.

Stabilized chlorine tablets in cartridges which float on the surface of the swimming pool have come into popular use by home owners who maintain their own swimming pools because it is then necessary to simply check the cartridge and replace it or refill it when all the chlorine tablets have been dissolved. Maintaining the chlorination of the water is then much less of a chore. Periodic checking of the chlorine level is reduced from weekly to about monthly or longer periods depending upon such factors as usage and water temperature besides average daily sun exposure. However, chlorine tablets generally leave a residue in the water which builds up in time and is not believed to be as effective as an aqueous solution of a chlorine-based oxidant, such as chlorine sodium hypochlorite or chlorinated sodium isocyanurate, for example, all of which aqueous solutions are referred to hereinafter as a liquid sanitizing agent, although the preferred liquid sanitizing agent is sodium hypochlorite with sodium isocyanurate added.

Professional pool maintenance personnel prefer to use a liquid sanitizing agents, and homeowners who maintain their own swimming pools would also prefer to use liquid sanitizing agents, but both would rather be free of the need to add liquid sanitizing agents on such a frequent basis as once a day, or even once a week. The liquid sanitizing agents are usually poured from a jug while standing beside the pool, with the result that water with a high concentration of the liquid frequently splashes on clothing, thus seriously damaging the clothing.

STATEMENT OF THE INVENTION

An object of this invention is to provide a dispenser of liquid sanitizing agent from a reservoir which continually meters concentrated liquid to recirculating swimming pool water at a rate which may be adjusted to maintain the sanitizing agent at a desired daily level.

The concentrated sanitizing liquid is stored in a main reservoir large enough to hold a two- or four-week supply. A measured reservoir (large enough to hold a supply of the sanitizing agent for a single day of pumped recirculation) is positioned for it to be filled from the main reservoir by the force of gravity via a check valve while the recirculating pump is off. When the pump is turned on, a pressure cylinder initially filled with air is partly filled with water from the swimming pool recirculation line which pressurizes the air. The pressurized air is introduced into the measured reservoir to force the sanitizing agent out through a rate control valve into the swimming pool recirculation return line at the vacuum side of the recirculation pump. The check valve between the main and measured reservoirs prevents additional liquid sanitizing agent from entering the measured reservoir while the pump continues to run. When the pump stops, the water in the positive pressure cylinder drains, relieving the air pressure from the measured reservoir. The check valve between the main and measured reservoirs then opens to allow the measured reservoir to refill. At the same time, a check valve at the top of the positive pressure cylinder opens to allow air under atmospheric pressure to refill the cylinder. This prevents the cylinder from developing a negative pressure so that liquid sanitizing agent is not drawn into the cylinder when the pump is turned off.

The novel features that are considered characteristic of this invention are set forth with particularity in the appended claims. The invention will best be understood from the following description when read in connection with the accompanying drawings.

DETAILED DESCRIPTION OF THE INVENTION

Figure 1:
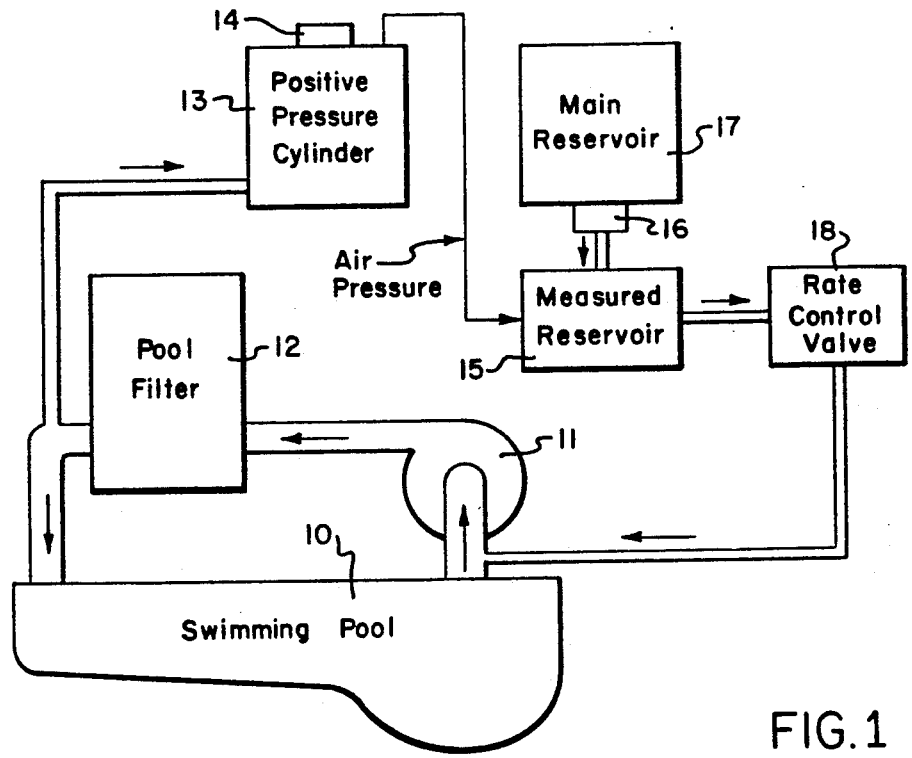
FIG. 1 is a schematic diagram of the present invention.

Referring to FIG. 1, a swimming pool 10 is shown schematically with a recirculating centrifugal pump 11 and filter 12. The pump draws water out of the pool and forces it under pressure through the filter 12 usually comprised of spaced fabric discs in a cylinder filled between the discs with diatomaceous earth. Water is then returned to the swimming pool under pressure.

In order to continually add a liquid sanitizing agent, such as an aqueous solution of sodium hypochlorite with added sodium isocyanurate, a positive pressure cylinder 13 is connected to the pool recirculation line to partially fill with water, thus pressurizing air within the cylinder. A check valve 14, which allows the cylinder to fill with air under atmospheric pressure, is closed by this positive air pressure that is connected to a measured reservoir 15 previously filled under the force of gravity through a check valve 16 with liquid sanitizing agent from a main reservoir 17. Air under pressure thus forces the liquid from the measured reservoir at a controlled rate through a valve 18 back into the recirculation line at the vacuum side of the pump 11. Once in the pool water, sodium hypochlorite releases free chlorine and the sodium isocyanurate increases the effectiveness of the sodium hypochlorite chlorine by reducing loss of available free chlorine due to untraviolet radiation from the sun.

Figure 2:
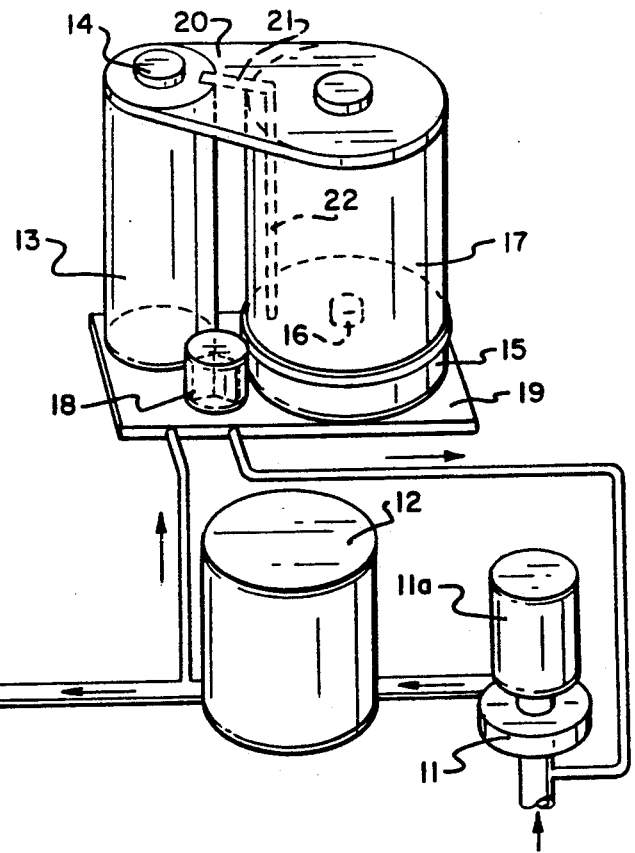
FIG. 2 illustrates in a perspective view the metering apparatus of the invention shown schematically in FIG. 1.

FIG. 2 illustrates a perspective view of an installation of the apparatus described with reference to FIG. 1. The pool water under pressure at the outlet of the filter 12 is connected by a small line to the positive pressure cylinder 13. Once the cylinder 13 begins to fill with water, the check valve 14 (normally open to the atmosphere) closes to force air under pressure into the measured reservoir 15 though a small line that may pass through the main reservoir to a port on the top of the measuring cylinder 13. A check valve 16 normally open to the main reservoir 17 then closes to force liquid in the measured reservoir 15 out through the rate control valve 18 via a passage in a base plate 19. The rate control valve 18 is set to allow the liquid to flow out of the measured reservoir at a desired rate. The outlet of the control valve 18 is connected to the vacuum side of the pump 11 where it is added to the recirculated swimming pool water.

The measured reservoir is a cylinder sufficiently large (for example, 6" in diameter and 2" in height) to provide for highly concentrated liquid sanitizing agent to flow throughout one day of pool recirculation at the rate set by the control valve. Thus, by selecting the proper size of the measuring reservoir and then setting the flow rate to just empty the measuring reservoir in one period of water recirculation each day, an optimum rate for adding liquid sanitizing agent during the active period of the pool each day may be set to maintain the desired ppm level of the sanitizing agent.

In the event that the period during which the pool is active varies from day to day, the measured reservoir may be selected to be sufficiently large for the longest period anticipated, and the control valve is set for the rate required to maintain the desired ppm level of sanitizing agent throughout each active period. If the pump is stopped after some shorter period, the measuring reservoir will be partially emptied, but it will be automatically refilled to the original level. If, on the other hand, the pump should be allowed to run longer than the longest expected period, the measured reservoir will be completely emptied and may become partially or fully filled with pool water. However, once the system is run through one complete cycle within the longest recirculation period anticipated, its intended operation will return to normal.

Thus, FIG. 2 illustrates in a perspective view a preferred embodiment of the components in the system of FIG. 1 which, besides the centrifugal pump 11 driven by an electric motor 11a and the filter 12, consist of the positive pressure cylinder 13 with a check valve 14, a measured reservoir 15 with a check valve 16, a main reservoir mounted over the measured reservoir, and the control valve 18, all mounted on a base plate 19 through which an inlet channel is provided for the high pressure pool water into the positive pressure cylinder 13 and an outlet channel is provided from the control valve 18 to a small return line connecting to the vacuum side of the centrifugal pump 11. A cover plate 20 for the positive pressure cylinder 13 and main reservoir 17 supports a channel 21 which connects the positive pressure cylinder 13 to a small tube 22 which passes down through the main reservoir 17 to the top of the measured reservoir 15.

The main reservoir has a bung hole in the cover plate 20 to facilitate pouring in liquid sanitizing agent from time to time. To avoid evaporation of the liquid through that bung hole, a plug 24 is placed over it. The bung hole may be tapped to receive a threaded plug, but in either case, care must be taken not to seal the opening completely, such as by drilling a small hole 24a through the plug in order to assure that a negative pressure does not develop in the main reservoir 17 as the liquid is dispensed through the measured reservoir 14.

Figure 3:
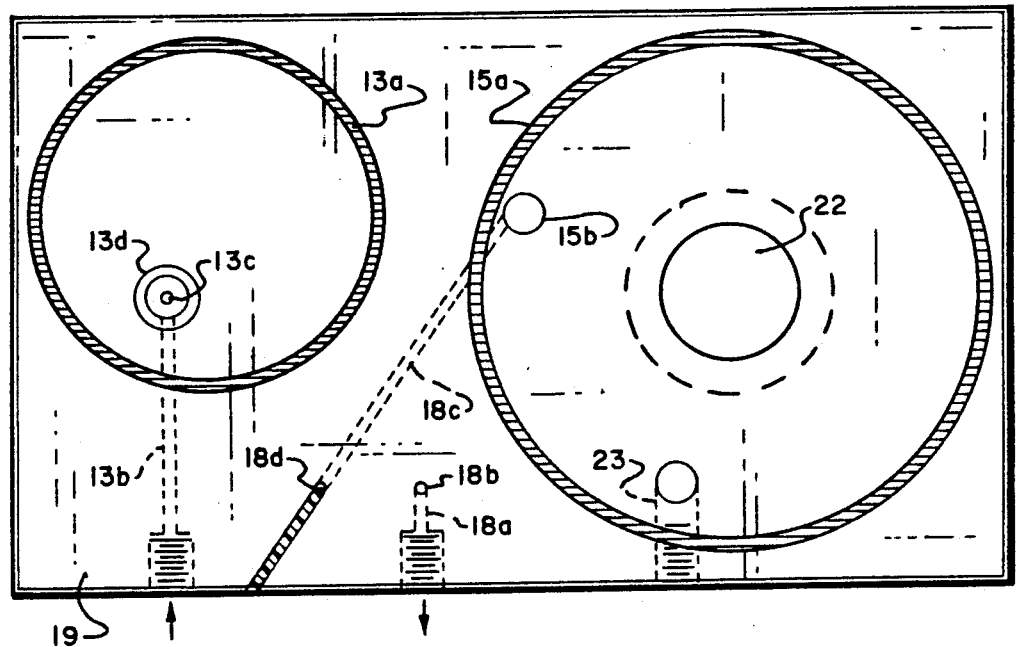
FIG. 3 illustrates in a plan view a base plate for the metering apparatus of FIG. 2.
Figure 4:
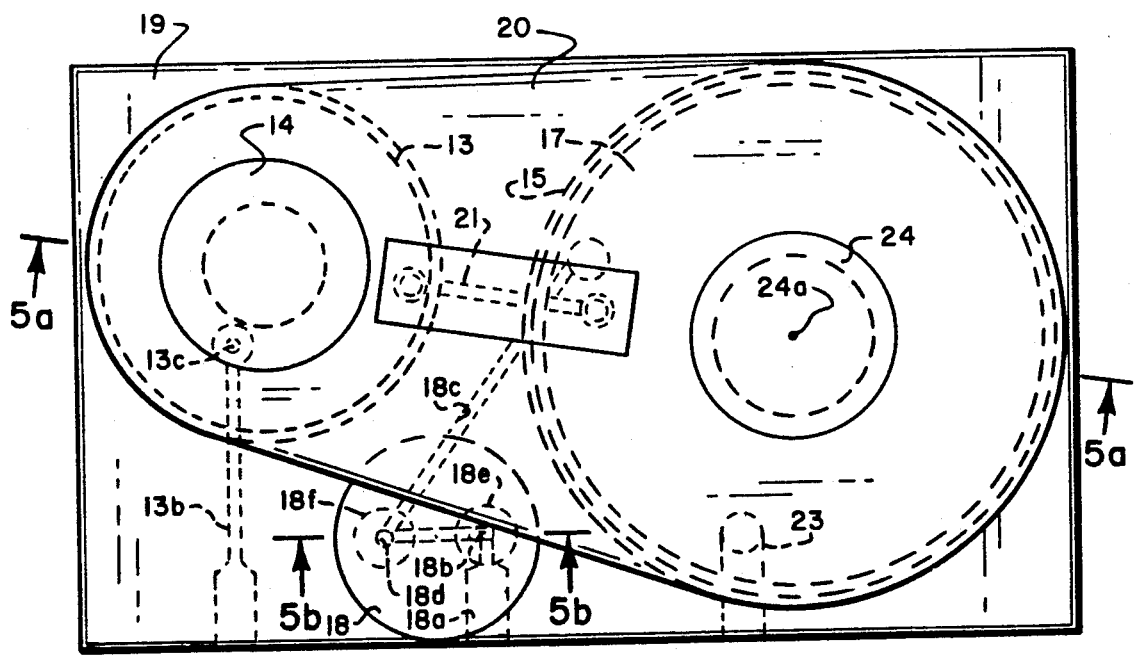
FIG. 4 is a plan view of the metering apparatus of FIG. 2 on the base plate of FIG. 3.

To better understand the operation of the liquid chlorinating dispenser, details of construction of the preferred embodiment will now be described with reference to FIGS. 3 through 5, starting with the base plate 19 shown in a plan view in FIG. 3. An annular groove 13a is cut in the base plate to receive the cylindrical wall of the pressure cylinder. The inlet channel 13b is drilled, countersunk and tapped to receive a small tube fitting. A port 13c is drilled perpendicular to the surface of the plate 19 to intersect the inlet channel 13b. A small annular groove 13d is cut to receive an inverted cup (not shown) with a side hole so that water under positive pressure will be directed toward the cylindrical wall instead of toward the check valve 14 in the cover plate 20 shown in FIG. 2.

An outlet channel 18a is drilled, countersunk and tapped to receive a small tube fitting, and a port 18b is drilled into the plate 19 to intersect the outlet channel 18a. A cross channel 18c is also drilled to intersect with a cylindrical port 15b inside an annular groove 15a cut to receive the cylindrical wall of the measured reservoir 15. That cross channel passes under a point where a port 18d is drilled through the surface of the plate 19. The cross channel from the port 15b to the port 18d is plugged between that port 18d and the side of the base plate. In that manner a channel is provided connecting the measured reservoir 15 to the control valve 18 which is seated on the base plate 19 over the ports 18b and 18d, as shown in FIG. 4 which illustrates the assembled liquid dispenser in a plan view.

Figure 5:
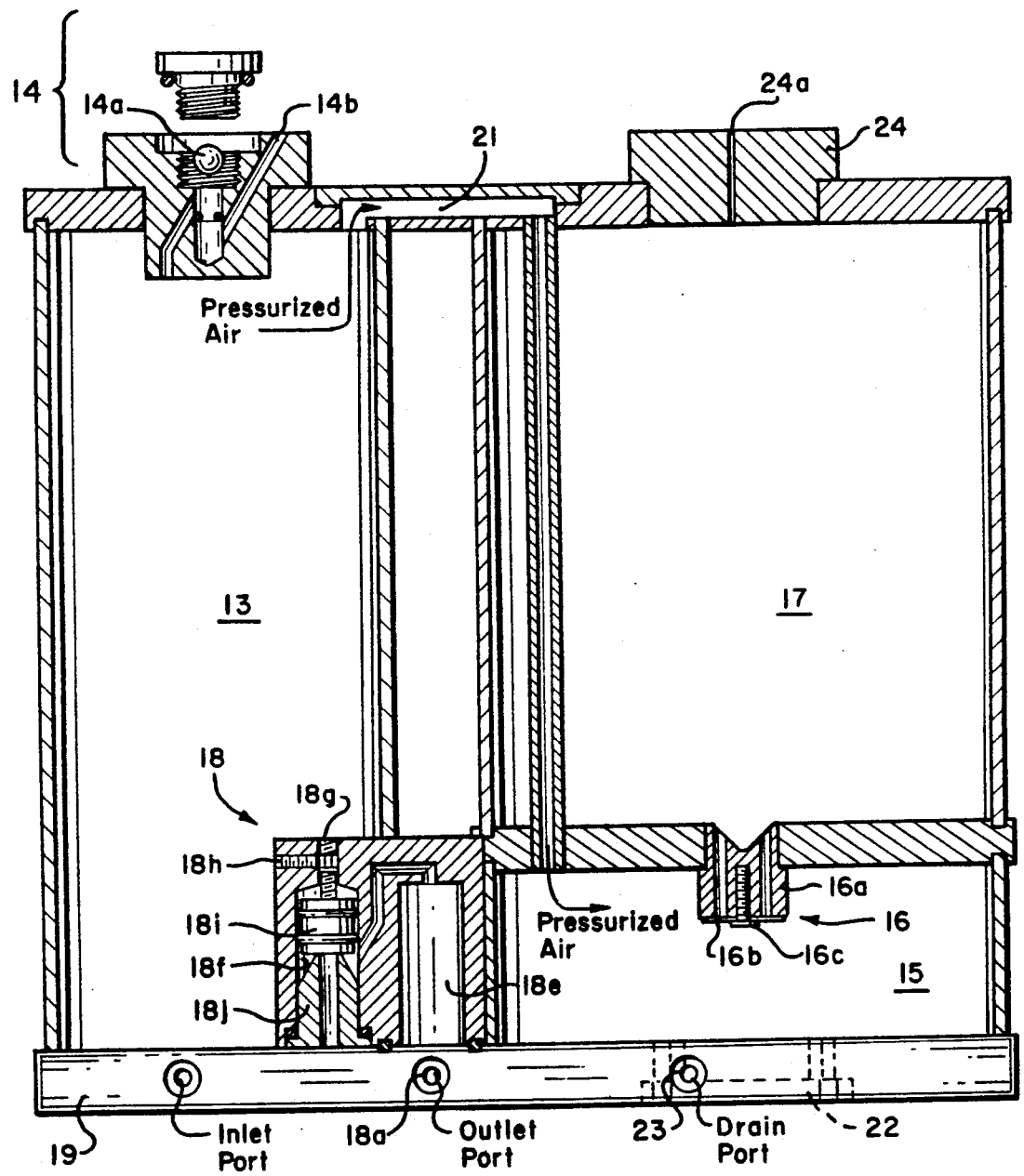
FIG. 5 illustrates a vertical cross section of the two large cylindrically shaped components of the metering apparatus taken along a line 5a—5a of FIG. 4, and of the one small cylindrically shaped component housing a metering valve taken along a line 5b-5b of FIG. 4.

A cross section of the positive pressure cylinder 13, main reservoir 17, and measured reservoir 15 taken on a line 5a—5a is shown in FIG. 5, together with a cross section of the control valve 18 taken on a line 5b—5b. The base plate 19 is shown in elevation.

That cross section of the control valve 18, shows that the control valve is machined from a cylindrical block of material, such as plexiglass, by drilling two cylindrical recesses, one to serve as a drip collecting chamber 18e and the other to serve as a control valve chamber 18f. An axial hole is drilled and tapped to receive a valve adjusting screw 18g, and another hole is drilled and tapped to receive a set screw 18h which secures the adjusting screw 18g once the valve is opened to the position desired by raising a valve cylinder 18i which is threaded on the adjusting screw 18g. To shut the control valve off, the adjusting screw is turned in the opposite direction to lower the valve cylinder 18*i* onto a cone-shaped seat 18*j* which has an axial channel for passage of the liquid from the measured reservoir 15 via the channel 18*c* (FIG. 3) and through to the drip collecting chamber 18*e*. The valve cylinder 18*i* has a flat face over the cone-shaped valve seat 18*j* which seals the axial channel when the valve cylinder 18*i* is down to shut off flow as shown. Two O-rings on the valve cylinder 18*i* prevent it from turning as the adjusting screw 18*g* is turned to raise or lower the valve cylinder 18*i*. It also prevents seepage past the valve cylinder 18*i*. All of the liquid, which is a concentrated solution entering the control valve 18 under pressure, passes up through the axial channel of the valve seat 18*j* and out into the drip chamber 18*e*. From there it flows out through the outlet channel 18*a* to the vacuum side of the centrifugal pump 11, as shown in FIG. 2.

In practice, the valve adjusting screw 18*g* is turned to firmly seat the valve cylinder 18*i* on the conical valve seat 18*j* and then backed off to open the control valve just a crack sufficient to allow drops of the liquid sanitizing agent to drop into the collecting chamber 18*e*. As the drops collect, they will flow out of the port 18*b* in the bottom of the chamber 18*e* and from there out through the outlet port 18*a* in the base plate 19 to the swimming pool recirculation return line at the suction side of the pump 11.

When the pump is turned on, water under pressure partially fills the positive pressure cylinder 13 to pressurize the air and closes the check valve 14 which may be a ball check valve as shown. The air under pressure then flows through the channel 21 into the measured reservoir 15, thus raising the pressure of the liquid sanitizing agent. That immediately closes the check valve 16 shown in FIG. 5 which is comprised of a plug 16*a* in the wall between the reservoirs 15 and 17. The plug has holes drilled through it which are covered by a flexible disc 16*b*, such as a rubber disc, held over the holes by a screw 16*c*. When the pump is turned on, the pressure in the measured reservoir presses disc 16*b* against the plug 16*a* to close the holes through the plug. When the pump is turned off, the pressure in the measured reservoir drops, and liquid sanitizing agent at a slightly higher head pressure flows through the holes past the rubber disc 16*b* to refill the measured reservoir 15. Other check valve designs could be used, but this plug and disc arrangement is simple and reliable.

An access plate 22 at the bottom of the measured reservoir 15 is provided to facilitate replacing the disc 16*b* should that become necessary. A drain channel 23 is drilled and tapped to receive a faucet or drain cock (not shown) to facilitate removing water that may have entered the measured reservoir after running the recirculation pump longer than the period it would require to exhaust all air under pressure in the pressure cylinder 13.

The check valve 14 over the positive pressure cylinder 13 is preferably a conventional ball check valve as shown. When the pump is turned on, air under pressure forces a ball 14*a* onto an O-ring seat to close the valve, thus allowing pressure in the positive pressure cylinder 13 to force air under pressure into the measured reservoir. When the pump is turned off, air pressure in that cylinder drops. Once the pressure in the pressure cylinder drops below atmospheric pressure, air enters through a venting passage 14*b* to raise the ball on the O-ring seat. This prevents any negative pressure on the measured reservoir.

Although a preferred embodiment of the invention has been described and illustrated herein, it is recognized that modifications and variations may readily occur to those skilled in the art. Consequently, it is intended that the claims be interpreted to cover such modifications and variations.

What is claimed is:

1. A dispenser of a liquid agent for the treatment of a recirculated body of water as it is being cyclically recirculated by a recirculating water pump which draws water out of a water reservoir, forces it through a filter under pressure and returns filtered water to said water reservoir under pressure, comprising a main reservoir for storing a quantity of said liquid agent for treatment of said water, a measured reservoir for storing a supply of said liquid agent to be dispensed at a controlled rate as said water is recirculated during a single cyclic period, said measured reservoir being coupled to said main reservoir by a coupling check valve to permit said measured reservoir to be refilled with liquid agent when it has been emptied and its internal pressure is less than pressure of said liquid in said main reservoir at said coupling check valve, a positive pressure cylinder connected to receive through the bottom thereof water being recirculated under pressure, and having a check valve at the top thereof for permitting said cylinder to fill with air under atmospheric pressure while said recirculating water pump is off, said check valve closing to allow air to be pressurized by recirculating water under pressure while said recirculating water pump is on, means for introducing pressurized air from said positive pressure cylinder into said measured reservoir to force said liquid agent out from said measured reservoir under pressure, and a control valve coupling said liquid agent being forced out of said measured reservoir to the intake side of said recirculating water pump, said control valve having means for adjusting the rate of flow of said liquid agent out of said measured reservoir.

2. A dispenser as described in claim 1 wherein said main reservoir is situated on top of said measured reservoir with said coupling check valve therebetween directly coupling the bottom of said main reservoir to the top of said measured reservoir.

3. A dispenser as described in claim 2 wherein said coupling check valve is comprised of a plug closing an aperture in a wall between said main reservoir and said measuring reservoir, said plug having at least one hole through it to allow said liquid agent to flow through it from said main reservoir into said measured reservoir, and a flexible disc secured to the bottom of said plug at a point offset from said hole, said disc covering said hole to seal said hole when pressure within said measured reservoir exceeds pressure of liquid agent at the bottom of said main reservoir.

4. A dispenser as defined in claim 3 wherein said plug has a plurality of holes spaced around a central point and said disc is secured at said central point, the shape of said disc being selected to cover all of said holes.

5. A dispenser as defined in claim 4 wherein said measured reservoir has an access plate at the bottom thereof opposite said coupling check valve to facilitate replacement of said disc.

6. A dispenser as defined in claim 5 including a drain channel for draining said measured reservoir when service of said dispenser is required.

7. A dispenser as defined in claim 1 wherein said control valve is comprised of a block of material having two cylindrical recesses, one serving as a control valve chamber and the other as a drip collecting chamber, said block being mounted on a plate having an inlet port to said valve chamber and an outlet port from said drip collecting chamber, said valve chamber having a cylindrical body with a conical end inserted therein, and said cylindrical body having an axial passage connecting to said inlet port, said control valve further having a channel for passage of said liquid agent from around said conical end of said cylindrical body to said drip collecting chamber, a valve cylinder with a flat face in said control valve chamber, and screw means for selectively positioning said flat face away from said conical end of said cylindrical body thereby to adjust the flow rate of said liquid agent into said drip collecting chamber.

8. A dispenser of liquid agent for treatment of water being recirculated by a centrifugal pump comprising,
- a main reservoir for said liquid agent coupled directly to a measured reservoir by a check valve so that said measured reservoir automatically refills upon being emptied by air under pressure from a positive pressure cylinder which partially fills with water being recirculated under pressure by said centrifugal pump to produce said pressurized air,
- a check valve on top of said pressurized cylinder to allow said pressurized cylinder to fill with air at atmospheric pressure when said pump is turned off and pressure of said recirculated water in said cylinder is relieved,
- a control valve between said measured reservoir and an intake side of said pump for control of the rate of flow of said liquid agent therethrough, the rate being so low as to produce drops collected in a chamber at the output of said control valve, whereby suction from said pump draws said collected liquid drops into said pump where it is mixed with recirculated water.

* * * * *